United States Patent
Weigert

(10) Patent No.: US 11,029,934 B2
(45) Date of Patent: Jun. 8, 2021

(54) METHOD AND SYSTEM FOR UPDATING LEGACY SOFTWARE

(71) Applicant: UniqueSoft, LLC, Palatine, IL (US)

(72) Inventor: Thomas J. Weigert, Lake Barrington, IL (US)

(73) Assignee: UniqueSoft, LLC, Palatine, IL (US)

( * ) Notice: Subject to any disclaimer, the term of this patent is extended or adjusted under 35 U.S.C. 154(b) by 22 days.

(21) Appl. No.: 16/215,085

(22) Filed: Dec. 10, 2018

(65) Prior Publication Data

US 2019/0187973 A1 Jun. 20, 2019

Related U.S. Application Data

(60) Provisional application No. 62/599,081, filed on Dec. 15, 2017.

(51) Int. Cl.
| | |
|---|---|
| *G06F 11/36* | (2006.01) |
| *G06F 8/76* | (2018.01) |
| *G06F 8/51* | (2018.01) |
| *G06F 8/65* | (2018.01) |
| *H04L 29/06* | (2006.01) |
| *G06F 8/72* | (2018.01) |
| *G06F 8/75* | (2018.01) |
| *H04L 29/08* | (2006.01) |

(52) U.S. Cl.
CPC .............. *G06F 8/65* (2013.01); *G06F 8/51* (2013.01); *G06F 8/72* (2013.01); *G06F 8/75* (2013.01); *G06F 8/76* (2013.01); *G06F 11/3608* (2013.01); *G06F 11/3684* (2013.01); *H04L 63/30* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 6,766,520 B1* | 7/2004 | Rieschl | G06F 9/45537 703/24 |
| 9,563,421 B2* | 2/2017 | Bostick | G06F 8/75 |
| 2007/0027671 A1* | 2/2007 | Kanawa | G06F 40/14 704/4 |
| 2007/0288419 A1* | 12/2007 | Strassner | G06N 5/02 706/55 |
| 2008/0320054 A1* | 12/2008 | Howard | G06F 16/284 |
| 2009/0222429 A1* | 9/2009 | Aizenbud-Reshef | G06F 8/36 |

(Continued)

*Primary Examiner* — Jason D Mitchell
(74) *Attorney, Agent, or Firm* — Garlick & Markison; Timothy W. Markison; Timothy D. Taylor

(57) ABSTRACT

A method includes analyzing operational code to determine identifiers used within the operational code. The method further includes grouping like identifiers based a relational aspect of the identifiers. The method further includes, for one or more identifier groups, determining potential feature(s) of the identifier group(s). The method further includes testing the potential feature(s) based on a corresponding feature test suite to produce feedback regarding meaningfulness of the potential feature(s). The method further comprises, when the meaningfulness is above a threshold, adding the potential feature(s) to a feature set. The method further includes, when the meaningfulness is at or below the threshold, adjusting analysis parameter(s), grouping parameter(s), feature parameter(s), and/or testing parameter(s).

16 Claims, 12 Drawing Sheets

(56) References Cited

U.S. PATENT DOCUMENTS

| | | | |
|---|---|---|---|
| 2014/0013304 A1* | 1/2014 | Vangala | G06F 8/75 717/123 |
| 2014/0089888 A1* | 3/2014 | Bhaskara | G06F 8/76 717/104 |
| 2020/0026577 A1* | 1/2020 | Dias | G06F 40/205 |
| 2020/0150954 A1* | 5/2020 | Nelluri | G06F 8/75 |
| 2020/0159592 A1* | 5/2020 | Hansmann | G06F 9/5055 |

\* cited by examiner legacy SW processing system 10

METHOD AND SYSTEM FOR UPDATING LEGACY SOFTWARE

CROSS REFERENCE TO RELATED PATENTS

This Application claims priority pursuant to 35 U.S.C. § 119(e) to U.S. Provisional Application No. 62/599,081, entitled "METHOD AND SYSTEM FOR UPDATING LEGACY SOFTWARE," filed Dec. 15, 2017, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer system operations and more particularly to a method and system for updating legacy software.

Description of Related Art

Since the advent of the computer, thousands of different programming languages have been created. Some programming languages use an imperative form (i.e., as a sequence of operations to perform), while others use a declarative form (i.e. the desired result is specified, not how to achieve it). In either case, the description of a program is split into the two components of syntax (form) and semantics (meaning).

As programming languages have evolved, they are less tied to the hardware of the computers executing them. This frees computing programmers to create more diverse and computationally intensive programs with less effort and in less time. While advances in computing programming continue to occur, there are still limitations (many prohibitive) of using multiple programming languages in a single program. For instance, a convention in one language may be a requirement in another. Further, each language conventions affects individual source files and requires unique compilers and/or interpreters to process.

Many programs that are still used today have evolved over years or even decades. When the program was first created, it was written in a first programming language to operate a first type of computing device. As years pass, the first programming language may have become obsolete, the types of computing device running the program have improved in processing power and memory capacity, and it is very likely that different programmers are updating the program. This can recreate inconsistencies in the optimization of the program and/or in maintaining documentation of the program. As an example, for a software update of the program, the outdated programming language portion of the program will remain intact, but will includes a software complier and/or software interpreter to process that portion of the program.

BRIEF DESCRIPTION OF THE SEVERAL VIEWS OF THE DRAWING(S)

DETAILED DESCRIPTION OF THE INVENTION

Figure 1:
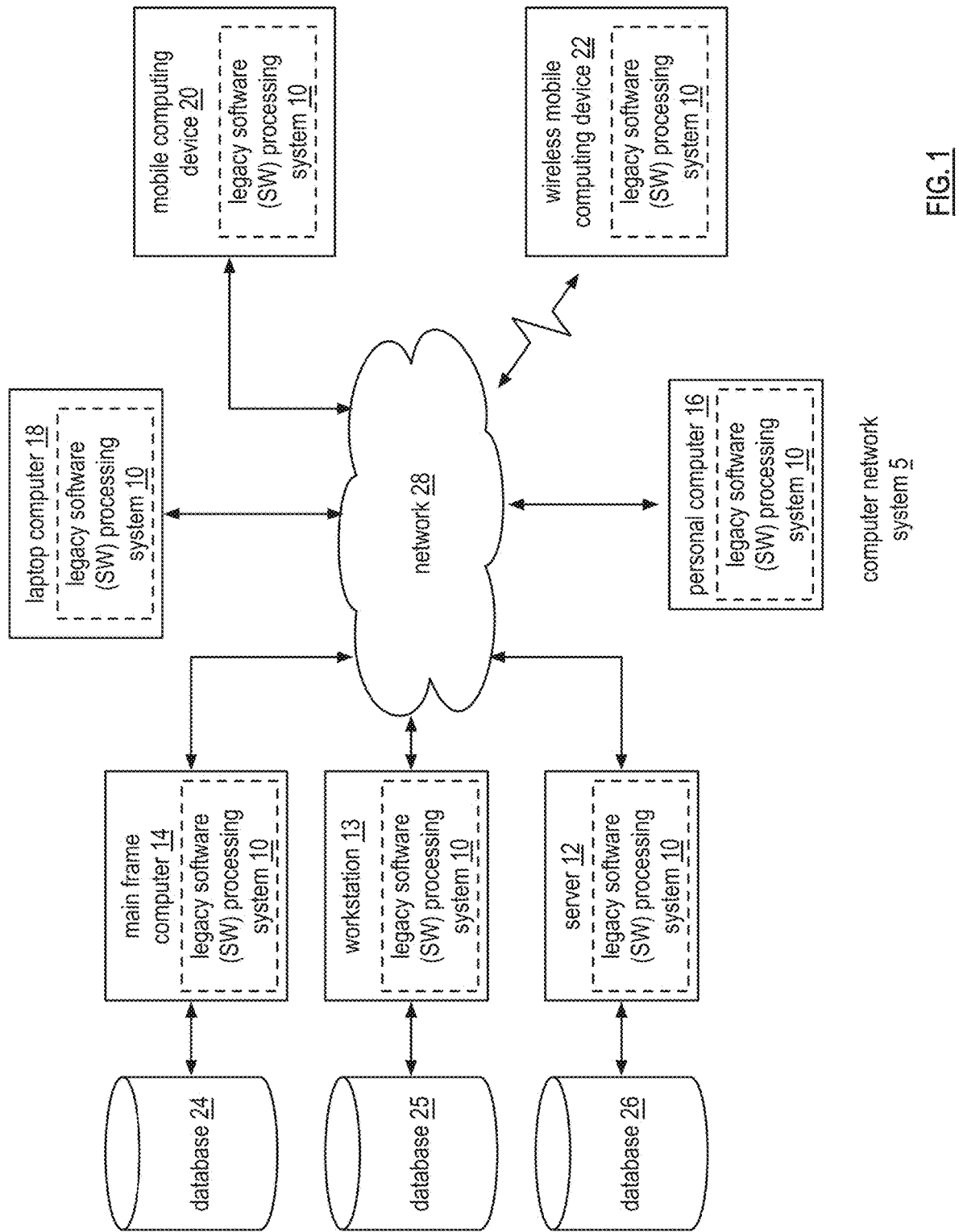
FIG. 1 is a schematic block diagram of an embodiment of a computer network system in accordance with the present invention.

FIG. 1 is a schematic block diagram of an embodiment of a computer network system 5 that includes a plurality of computing devices coupled to one or more networks 28. For example, the computing devices include servers 12, workstations 13, mainframe computers 14, personal computers 16, laptop computers 18, mobile computing devices 20 (e.g., tablets), and/or wireless mobile computing devices 22 (e.g., cell phones). One or more of the computing device may be coupled to one or more databases. For example, mainframe computer 14 is coupled to database 24; workstation 13 is coupled to database 25; and server 12 is coupled to database 26. Note that a database includes one or more storage devices, where a storage device includes a plurality of storage components (e.g., disk drives, solid state memory, etc.) and a memory controlling processing module. The computing device may be directly coupled to a database and/or may be coupled through the network 28.

The network 28 includes one or more of a local area network (LAN), a wireless LAN, a wide area network (WAN), a wireless WAN, terrestrial communication infrastructure, satellite communication infrastructure, cell telephone networks, the Internet, and/or any combination thereof. Accordingly, each computing device 12-22 includes one or more network interfaces (e.g., a network card, a driver, etc.) to transceive data via the network.

Regardless of the type of computing device, each of the computing devices executes operational code to perform one or more desired functions. Operational code may be a software program (or application) or a portion thereof (e.g., one or more subroutines). Typically, a computing device includes a collection of software programs to perform a wide variety of functions. For example, a collection of software programs includes an operating system (or multiple operating systems), utility software (e.g., software to analyze, configure, optimize, and/or maintain a computer), and application software (e.g., word processing, spreadsheet, drawing, photo processing, etc.).

At various times in the life of a software program, it is updated with software patches and/or newer versions of it are created and released. Over time, the programming language(s) used to create the original software program, patches, and/or new versions have become outdated (e.g., no longer used, no longer supported, rarely used, etc.). Further, over time, the hardware of the computing devices has significantly improved in processing capabilities, processing speed, data storage, data communications, etc. As such, a software program that was written (and optimized) for particular hardware capabilities of a few years ago (or longer ago) is no longer optimal for more current hardware capabilities. When a software program becomes less than optimally matched for the hardware capabilities of a computing device, it is desirable to update the software program. To update an existing software program in an efficient and automated manner, one or more of the computing devices 12-22 can perform a legacy software (SW) processing system or a portion thereof, which can be done serially and/or in parallel. One or more embodiments of a legacy SW processing system will be described in greater detail with reference to one or more of FIGS. 2-18.

Figure 2:
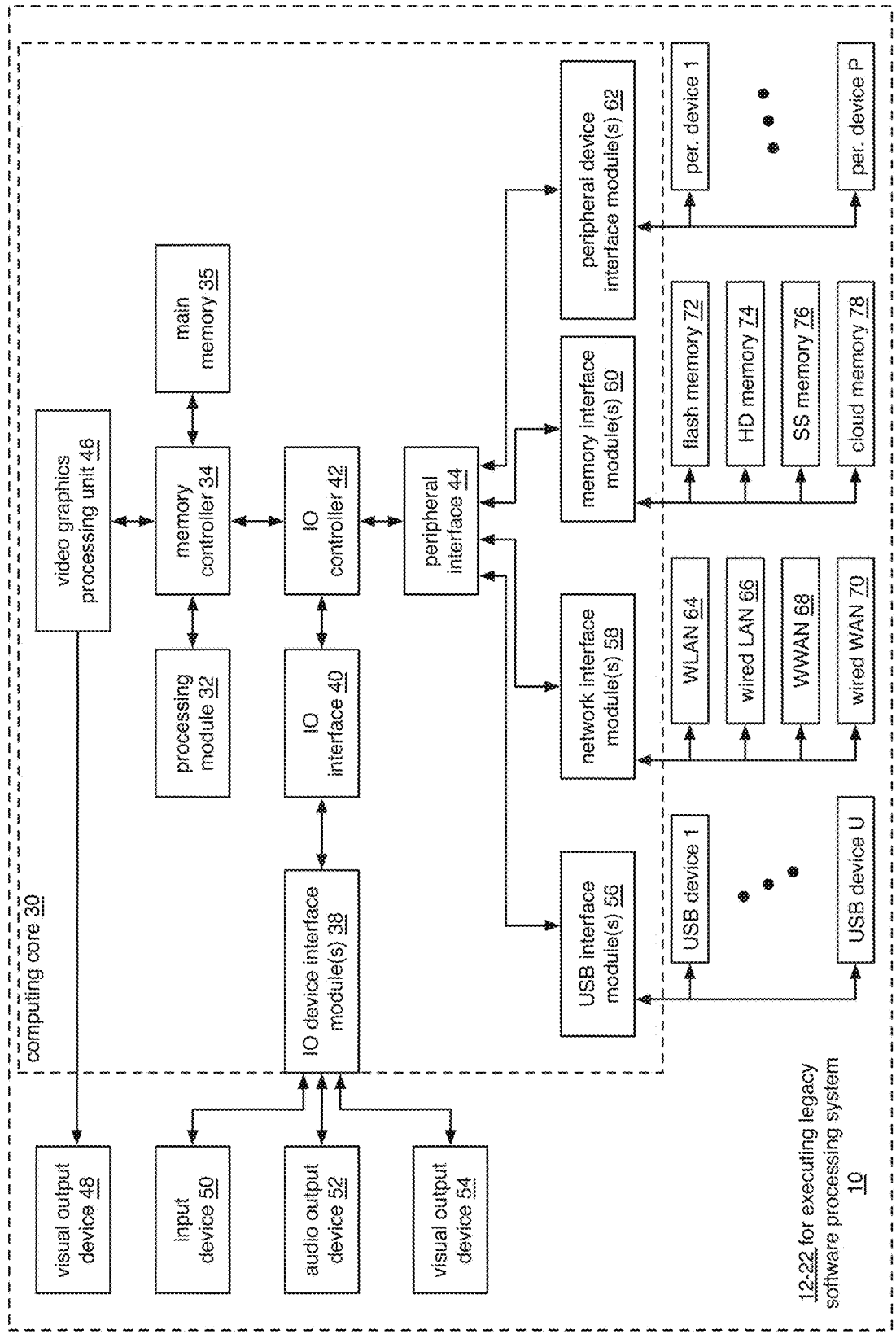
FIG. 2 is a schematic block diagram of an embodiment of a computing device in accordance with the present invention.

FIG. 2 is a schematic block diagram of an embodiment of a computing device 12-22 that includes a computing core 30, one or more input devices 50 (e.g., keypad, keyboard, touchscreen, voice to text, etc.), one or more audio output devices 52 (e.g., speaker(s), headphone jack, etc.), one or more visual output devices 48 and 54 (e.g., video graphics display, touchscreen, etc.), one or more universal serial bus (USB) devices, one or more networking devices (e.g., a wireless local area network (WLAN) device 64, a wired LAN device 66, a wireless wide area network (WWAN) device 68 (e.g., a cellular telephone transceiver, a wireless data network transceiver, etc.), and/or a wired WAN device 70), one or more memory devices (e.g., a flash memory device 72, one or more hard drives 74, one or more solid state (SS) memory devices 76, and/or cloud memory 78), and one or more peripheral devices.

The computing core 30 includes a video graphics processing unit 46, one or more processing modules 32, a memory controller 34, main memory 35 (e.g., RAM), one or more input/output (I/O) device interface module 38, an input/output (I/O) interface 40, an input/output (I/O) controller 42, a peripheral interface 44, one or more USB interface modules 56, one or more network interface modules 58, one or more memory interface modules 60, and/or one or more peripheral device interface modules 62. Each of the interface modules includes a combination of hardware (e.g., connectors, wiring, circuitry, etc.) and operational instructions stored on memory (e.g., driver software) that is executed by the processing module 32 and/or a processing circuit within the interface module. Each of the interface modules couples to one or more components of the computing device 12-22. For example, one of the IO device interface modules 38 couples to an audio output device 52. As another example, one of the memory interface modules 60 couples to flash memory 72 and another one of the memory interface modules 60 couples to cloud memory 78 (e.g., an on-line storage system and/or on-line backup system). Note that, from computing device to computing device, a computing device may include more or less components than shown. Further note that the computing core of a computing device may include more or less components than shown.

Figure 3:
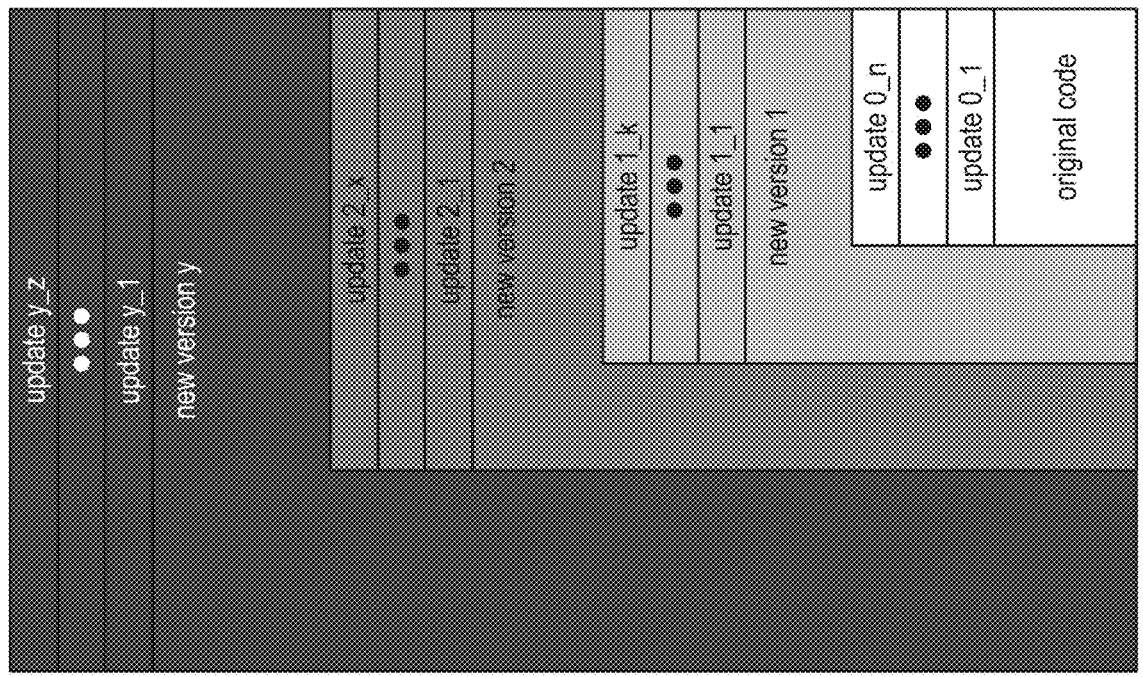
FIG. 3 is a diagram of an example of legacy operational code in accordance with the present invention.

FIG. 3 is a diagram of an example of legacy operational code 15 that includes multiple updates and multiple versions. In this example, the operational code 15 includes "y" versions of the operational code (e.g., a software program or a portion thereof) and each version includes multiple updates. For instance, the original code includes updates 0_1 through 0_n; version 1 includes updates 1_1 through 1_k; version 2 includes updates 2_1 through 2_x, and version "y" includes updates y_1 through y_z. Each of the updates corresponds to a software patch or some minor improvement to the software program, or portion thereof. A new version corresponds to an improvement (e.g., a new feature, an updated feature, update for a new hardware platform, update to a new programming language, etc.) to the software program, or a portion thereof.

The software program, or portion thereof, represented by the operational code 15 is written in source code using one or more programming languages. In general, source code is a collection of computer instructions (which may also include comments) written in one or more human-readable computer languages. Further source code generally includes two primary components: syntax (e.g., form) and semantics (e.g., meaning). Source code of a software program is stored in one or more text files that is/are arranged into a directory (or source) tree in local memory of a computing device, in a server, in cloud storage, and/or stored in a database.

Source code may be written using imperative programming languages or declarative programming languages. As is known, imperative programming languages express the software program, or portion thereof, as a series of declarations (e.g., couple variables to data types), expressions (e.g., yields values), and/or statements (e.g., assign expressions to variables or use values of variables to change control flow of the program). As is also known, declarative programming languages specify the properties of the desired output using mathematical relationships (e.g., functional and/or logical) between declared objects and their properties. Source code examples shown herein are generally illustrated as being written using one or more imperative programming languages but are equally applicable to declarative programming languages.

Source code may further be written using different programming languages for a variety of reasons. For example, subroutines are written (or have been written) in one or more programming languages, are stored in a library, and selected subroutines linked together via library linking to produce the desired software program. As another example, a main interpreter interprets a plurality of macros (or other rule based and/or pattern based add-ins) to produce the desired software program. As yet another example, the source code was originally written using a programming language that is now disfavored (e.g., is now rarely, if ever, used; inferior to other programming languages; not supported, etc.) and new versions are written using more current programming languages. For a software program that was originated decades ago, it includes multiple versions that were written in now disfavored programming languages.

Typically, a programming will prepare some form of supporting documentation for a software program. The intent of the documentation is to document how the software program was written and how it is intended to work at the source code level. The supporting documentation is typically separate from the source code; however, the source code typically includes comments to describe lines of code (e.g., a subroutine, a line of code, etc.). The level of detail and the accuracy of the supporting documentation and source code comments vary greatly based on the programmer, company programming guidelines, the programming language, etc.

Figure 4:
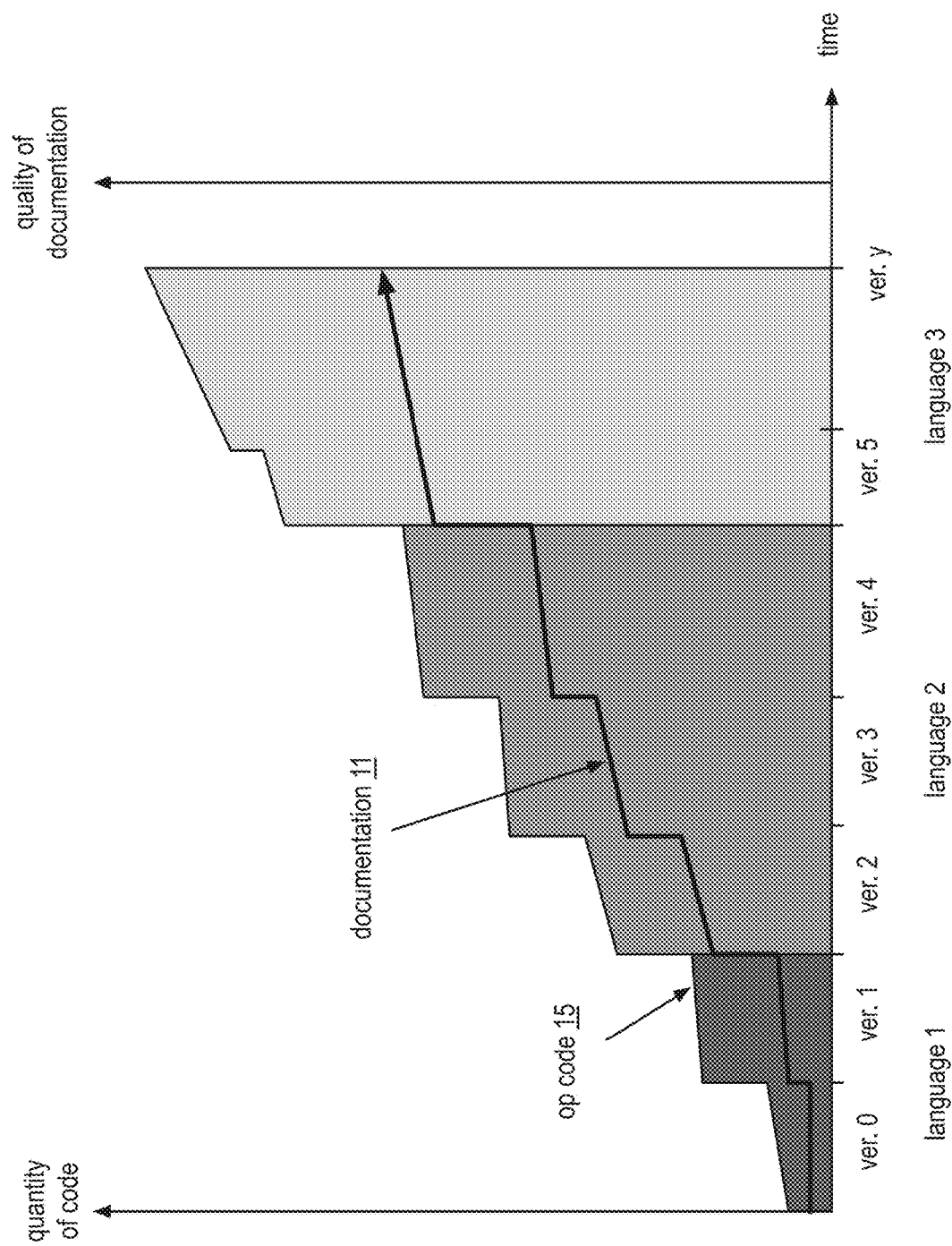
FIG. 4 is a diagram of another example of legacy operational code in accordance with the present invention.

FIG. 4 is a diagram of another example of legacy operational code with respect to quantity of code (e.g., number of lines of code of the operational code 15) and quality of documentation 11 over time. For some software programs, the time frame spans a few years and, for other software programs, the time frame spans decades. The longer the time frame, the more likely the software program includes sections that are written using one or more disfavored programming languages. Further, the longer the time frame, the more likely the supporting documentation 11 of the earlier software program versions is of a lower quality (e.g., less informative, less complete, etc.) than more recent versions.

In this example, the software program includes multiple versions written using three different programming languages. As shown, a first programming language was used to write the original and second versions of the software program; a second programming language was used to write versions two, three, and four of the software program; and a third programming language was used to write versions five through the current version. As a specific example, the first programming language is primarily used for mainframe computers and was written more than ten years ago; the second programming language is primarily used for servers and/or workstations and was written about ten years ago; and the third programming language is primarily for personal computers and was written less than ten years ago.

As is further shown, within a given version of the software program, a slope represents one or more updates. For each update, there is a corresponding update of the supporting documentation. To add to the difficultly of generating new operational code to replace the existing code, different programmers wrote different sections of the software program. As such, there are varying styles and levels of documentation.

Prior to the present invention, updating such a software program was limited to virtualization, rehosting, translation, and/or recoding by hand. Virtualization entails the use of converters to run the sections of the operational code that was written using a disfavored programming language to run on newer computer platforms and/or new computer equipment. Note that there may be multiple layers of converters (e.g., a first layer converter to convert from a first disfavored programming language to second programming language that is now disfavored, which is converted to a third programming language via a second layer converter). Rehosting the software program entails the use of emulators to mimic older computer platforms and/or equipment (e.g., mainframe computers) on newer equipment (e.g., personal computers, workstations, cloud computing, cloud storage, etc.). Translation involves a conversion of the operational code from one programming language into another. This, however, this do not produce an understanding of the operational code, does not produce an explanation of the functionality of the code, and is often inaccurate for the entire code.

Figure 5:
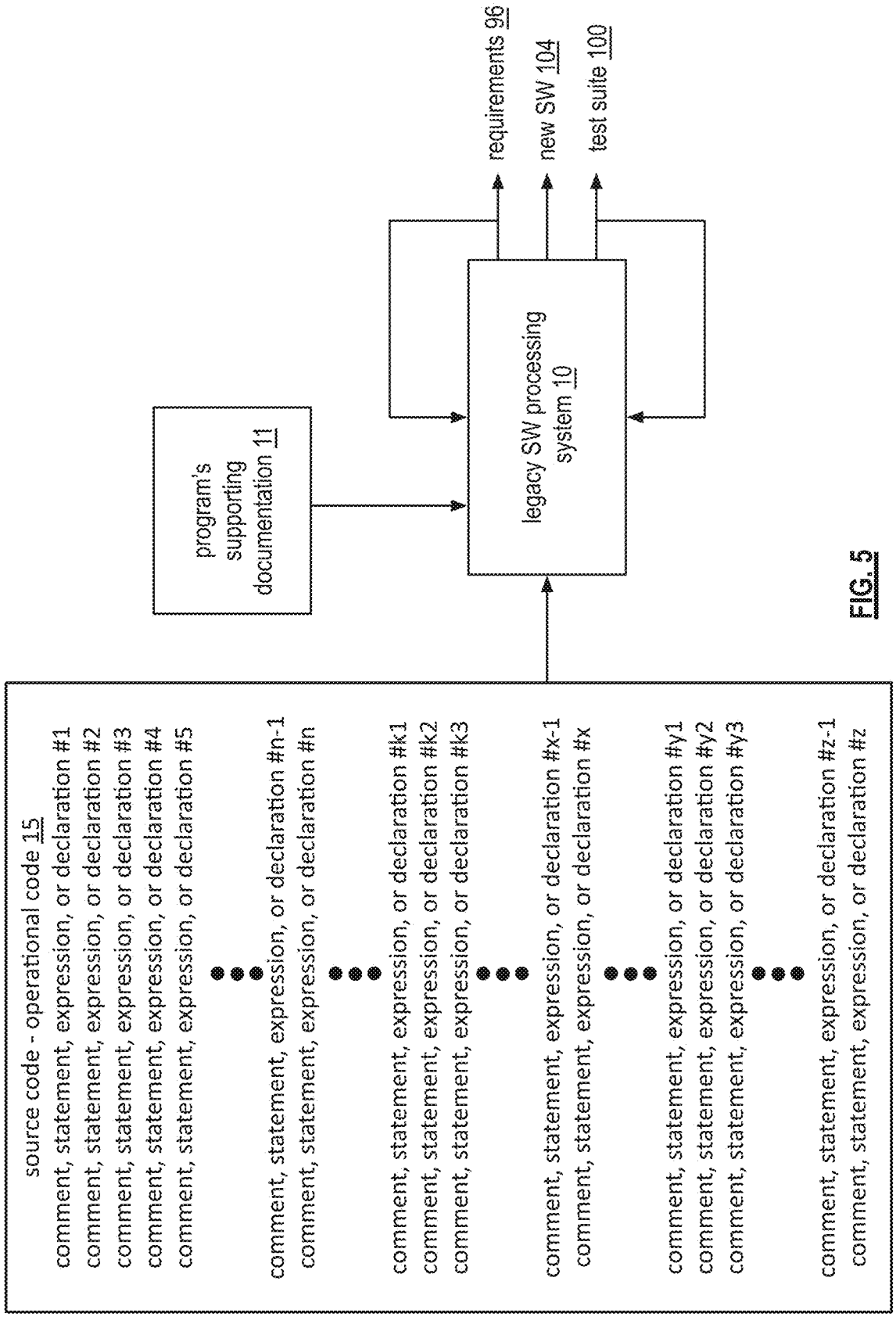
FIG. 5 is a schematic block diagram of an embodiment of a legacy software processing system in accordance with the present invention.

FIG. 5 is a schematic block diagram of an embodiment of a legacy software processing system 10 that functions, in an automated manner, to identify requirements 96 of the software program, to create a new test suite 100, and to create new operational code 104 of the software (SW) program from a legacy software program. The legacy software processing system 10 is implemented on one or more of the computing devices 12-22 of FIG. 1. In general, the legacy software processing system 10 functions to eliminate disfavored programming languages, eliminate use of emulators, eliminate use of converters, to provide an understanding of the legacy SW, to provide an explanation of the legacy SW, to enable ease of future maintenance of the new software program, and/or to generate new operational code using current and generally accepted programming conventions and/or programming languages.

Typically, the legacy software program is in source code, but the legacy software processing system 10 may convert legacy object code or machine code into new software. In the present example, the legacy software is shown as source code—operational code 15, which includes a plurality of lines of code (e.g., line # through line #z). The source code typically includes one or more of sub-components, interfaces, functional logic, tables, interface details, dependencies, and/or input/output data flow between the sub-components and between the sub-components and external components. Each line of code may be a comment, a statement, an expression, or a declaration. One or more lines of code may be related (e.g., to perform a task, as a subroutine, a library entry, etc.). Lines of code may be written such that they are performed sequentially and/or concurrently. For example, within a series of lines of code (e.g., a subroutine, a library entry, etc.), each line of code is performed sequentially, while another series of lines of codes are performed concurrently with the other series of lines of code.

As is generally known, a comment is a note provided by the programmer to provide insight into a section of the source code (e.g., one or more lines of code) and includes some form a delineation to indicate that it is a comment (e.g., *a comment may be contained between asterisks, which the computing devices interprets as a comment*). A statement causes a computing device to carrying out an action (e.g., if "x", then "y"; "z"="a"+"b"; etc.). A statement may be a simple or compound statement. An expression causes a computing device to produce a specific value for a particular identifier (e.g., Customer_Count=0; Customer_Count=Customer_Count+1; etc.). A declaration (including definitions) causes a computing device to specify a property for an identifier (e.g., Customer_Count: integer; X: variable; etc.).

As an example of operation, the legacy SW processing system 10 determines the architecture and features of the legacy operational code 15. To verify the understanding of the architecture and features of the legacy operational code 15, the system 10 generates test cases from the legacy operational code 15. The determining of the features is adjusted based on results of the test cases, which may also be adjusted as the understanding of the features increases. When the understanding of the architecture and features is at a desired level (e.g., the identified features adequately passes the test cases), the system 10 generates the requirements 96 of the legacy operational code 15 from the determined features and architecture. The requirements 96 provide information regarding the desired operations, desired functions, desired results, user input/output options, system constraints, and/or operational constraints (e.g., response times) of the legacy SW program (e.g., legacy source code). For example, the requirements may be formatted in one or more of if-then-else statements, state table(s), message sequence chart(s) (e.g., MSC), application system state transitions, which identifies one or more pre-conditions, one or more actions, and one or more post-conditions, and another agreed up format.

The system 10 further creates rules for creating the new software 104 based on the requirements. The system 10 also creates, from the legacy operational code 15, a test suite 100 for testing the new software 104 as it is being created. The system 10 begins to create the new SW 104 based on the requirements 96 and the rules. For each iteration of creating the new SW 104, the system 10 tests the new software 104 based on the test suite 100. The generation of new SW 104 from requirements and the testing thereof is described in U.S. Pat. No. 8,972,928, entitled, "SYSTEM AND METHOD FOR GENERATING APPLICATION CODE", filed Aug. 30, 2011, and issued on Mar. 3, 2015. The resulting new SW 104 will be in a new programming language, will be modular, will be implementable on a new computer platform, and/or will have improved performance with respect to the legacy operational code 15.

Figure 6:
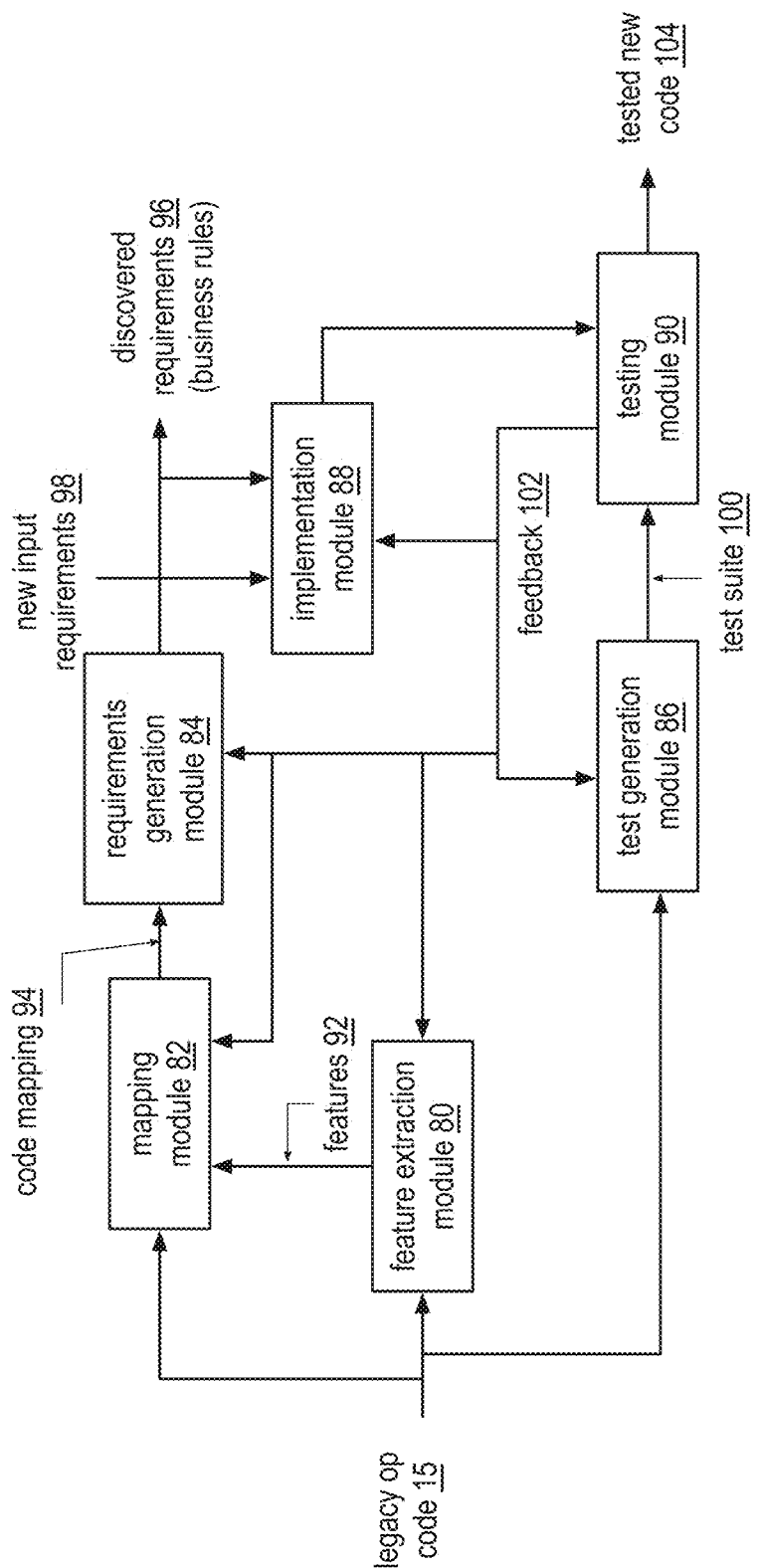
FIG. 6 is a schematic block diagram of another embodiment of a legacy software processing system in accordance with the present invention.

FIG. 6 is a schematic block diagram of another embodiment of a legacy software processing system 10 that includes a feature extraction module 80, a mapping module 82, a requirements generation module 84, a test generation module 86, an implementation module 88, and a testing module 90. Each module 80-90 may be associated with the same computing device 12-22 or different computing devices. For example, computing device 13 includes modules 80-90. As another example, a first personal computer 16 includes module 80, a second personal computer 16 includes module 82, a third personal computer 16 includes module 84, a fourth personal computer 16 includes module 86, a fifth personal computer 16 includes module 88, and a sixth personal computer 16 includes module 90. As yet another example, server 12 includes modules 80-84, workstation 13 includes modules 86 and 90, and personal computer 16 includes module 88.

In an example of operation, the feature extraction module 80 determines features 92 from the legacy operational (op) code 15 (e.g., legacy source code). As a general definition, a feature 92 is, from a programmer's perspective, a relevant piece of the source code. As such, a feature may be a single line of code (e.g., a comment, a statement, an expression, or a declaration) or a plurality of lines of code (e.g., a collection of comments, statements, expressions, and/or declarations). As a few examples of an almost endless possibility of examples, one feature is code regarding updating a user's account; another feature is a code regarding creating a user account; yet another feature is code regarding billing the user; a further feature is an idiom, and yet a further feature is a business rule.

In general, the feature extraction module 80 data mines the legacy operational code 15 to determine identifiers. An identifier is, in general, a name for elements of the source code such variables, constants, types, labels, function, subroutines, packages, etc. Most programming languages have a naming convention for identifiers and include some specific identifiers as key words (e.g., fixed identifiers). The naming convention defines rules for choosing the characters that constitute an identifier and may further include rules to distinguish the kind of identifier (e.g., variable, constant, type, function, subroutines, packages, etc.). For example, a naming convention defines the use of underscoring and/or hyphens for multiple word identifiers; camel case for multiple word identifiers, Hungarian notation, positional notation, composite word scheme, and/or other language specific conventions.

The feature extraction module 80 analyzes the identifiers to group the identifiers. The feature extraction module 80 analyzes the groups of identifiers to identify potential features and then analyzes the potential features to produce a list of features. The feature extraction module 80 adjusts it analysis based on feedback 102 from the testing module 90 as it is testing the new software 104. The functionality of the feature extraction module 80 is described in greater detail with reference to one or more of FIGS. 7-15.

The mapping module 82 generates a code mapping 94 of the legacy operational code 15 based on the features, the legacy operational code 15, and feedback from the testing module 90. In general, the mapping module 82 utilizes rules regarding relationship of features, identifies anchor points, identifies idioms, performs one or more symbolism algorithms, and utilizes one or more refactoring tools to generate the code mapping 94, which includes one or more code maps. In general, a code map represents one or more relationships between features, where a relationship corresponds to a commonality of the source code. For example, features having similar identifiers have a relationship based on the identifiers. As another example, features that include dependent lines of code have a relationship based on the dependency of the lines of code. As yet another example, features that are affiliated with an anchor point have a relationship based on the anchor point. As a further example, features that are affiliated with an idiom have a relationship based on the idiom. As yet a further example, related features, functions, and/or behaviors are often included in the same file.

The rules regarding relationships govern the types of relationships and the criteria to determine whether a feature is to be affiliated with the relationship. As an example, for a given relationship type (e.g., similar identifiers, etc.), the mapping module 82 applies the corresponding criteria (e.g., same word included in identifiers, similar meaning of identifiers, in a similar section of the code, etc.). As such, the mapping module 82 reads each possible feature, analyzes it in light of the criteria, and determines whether it is more likely than not that the feature should be affiliated with the relationship. If it is, the mapping module 82 includes it in an initial code map.

As a preceding, contemporaneous, or subsequent step, the mapping module 82 interprets the potential features and/or operational code 15 to identify anchor points. In general, an anchor point is a tag that specifies a subroutine, a library entry, a specific feature, and/or a specific set of features. The mapping module 82 augments the code maps based on the identified anchor points (e.g., adds and/or removes features from a code map).

As another preceding, contemporaneous, or subsequent step, the mapping module 82 interprets the potential features and/or operational code 15 to identify idioms. In general, an idiom is a figurative meaning that is different from the literal meaning. As an example, a feature that includes and identifier of "dead stick" has a figurative meaning that control has been lost. The mapping module 82 interprets features based on identified idioms to augment the inclusion or exclusion of a feature(s) from a code map.

As yet another preceding, contemporaneous, or subsequent step, the mapping module 82 applies one or more symbolism algorithms such that each code map includes symbolisms (e.g., colors, shapes, etc.) to identify a level of importance of features, type of feature (e.g., idiom, business rule, comment, subroutine or portion thereof, etc.), and where the features are within the legacy operational code 15. For example, a circle represents a subroutine; where a red circle represents an important subroutine, where a yellow circle represents a moderately important subroutine, and where a green circle represents a low importance subroutine.

As the mapping module 82 is generating one or more code maps and/or updates thereto, it is also annotating the generation of the code map. For example, the annotation includes a rational for a color map, the type of feature relationship being sought, the corresponding criteria, the rules used to generate the code map, an operational description of the features contained in the code map (e.g., virus detection, fraud detection, etc.), and/or a listing of the features.

The mapping module 82 tests the code mapping 94 (e.g., one or more of the code maps) based on feedback from the testing module 90 and/or by applying one or more refactoring tools. In general, refactoring allows for reconstructing a portion of existing operational code by changing the factoring without changing its external behavior. Refactoring functions to identify hidden, dormant, and/or previously undiscovered bugs, identify vulnerabilities of the operational code, simplifying the operational code, and/or eliminating unnecessary complexity. Examples of refactoring tools includes encapsulate field, generalize type, replace type-checking code with state/strategy, replace conditional with polymorphism, code breaking into more logical pieces, componentization to break code into reusable semantic units; extract class to move code from an existing class to a new class, extract method to turn a method into one or more new smaller methods, improving names and location of code, renaming of features and/or identifiers to more descriptive names, etc.

The mapping module 82 provides the resulting code mapping 94 to the requirements generation module 84. The above described processing by the mapping module 82 insures that the code maps represent the source code (directory, modules, files, functions, etc.) in a consistent and reliable manner. For instance, each of the code maps is created in accordance with a mapping template that allows mapping of the code to be understood with minimal labeling; uses color to represent distinguishing information of the code; uses shapes to represent functional modules or other aspect of the code; establishes dependencies between the functional modules to create patterns of functionality; and/or uses overlaying to further illustrate related functional patterns.

The requirements generation module 84 interprets the code mapping 94 to generate requirements 96 of the operational code 15. The requirements generation module 84 converts the code mapping 94 (e.g., code maps) into input requirements and parameters. The parameters prescribe physical, logical, and/or developmental constraints on implementing the new software 104. For example, the physical parameters include physical limitations of the system (e.g., clock rates, processing rates, data transference rates, etc.) and logical parameters may include software limitations (e.g., desired programming language, desired operating system, desired API, etc.). The inputted requirements provide information regarding the desired operations, desired functions, desired results, user input/output options, system constraints, and/or operational constraints (e.g., response times) of the resulting application code (i.e., software). For example, the inputted requirements may be formatted in one or more of if-then-else statements, state table(s), message sequence chart(s) (e.g., MSC), or another agreed up format. To convert the input requirements and the parameters into discovered requirements (and/or business rules) 96, the requirements generation module 84 functions similarly to the requirements unit 12 of co-pending patent application entitled System And Method For Implementing Application Code From Application Requirements, having a filing date of Jun. 22, 2105, and a Ser. No. 14/745,689.

The test generation module 96 functions to generate a test suite 100 from the legacy operational code 15. The test generation module 96 will be described in greater detail with reference to one or more of FIGS. 16 and 17.

The implementation module 88 and the testing module 90 function similarly to correspondingly named units of co-pending patent application entitled System And Method For Implementing Application Code From Application Requirements, having a filing date of Jun. 22, 2105, and a Ser. No. 14/745,689 to produce tested new operational code 104. Note that the implementation module 88 may also receive new requirements 98 for the creation of the new operational code 104. The new requirements may identify a new computer platform, system architecture requirements, new operational requirements, etc.

As an example, the system 10 converts device specific operational code into operational code that is operable by cloud computing and/or cloud storage. As another example, the system 10 removes unused code; migrates code from an older platform to one or more new platforms; merges code bases (e.g., multiple data centers, each using different software but doing essentially the same thing with some uniqueness); etc. The system 10 can further be used to test new software to determine where the code is likely to have defects; determine if the code has sufficient documentation to allow future change; and/or to verify quality control and/or security compliance.

Figure 7:
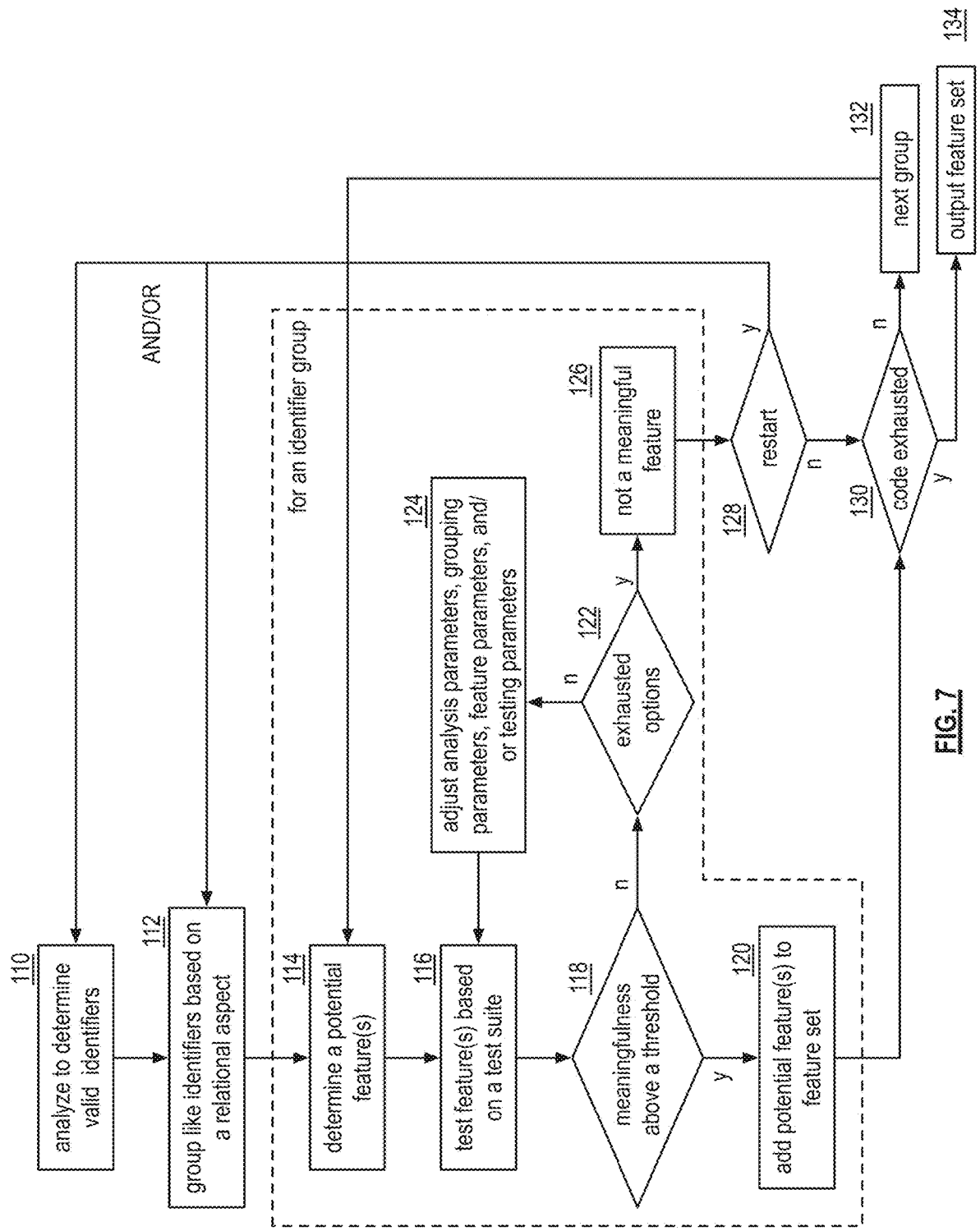
FIG. 7 is a logic diagram of an embodiment of a method executed by a feature extraction module of a legacy software processing system in accordance with the present invention.

FIG. 7 is a logic diagram of an embodiment of a method executed by a feature extraction module 80 when operable within one or more computing devices. In general, the feature extraction module uses a combination of syntax analysis and semantic analysis to identify meaningful features of the operational code 15. For example, syntax analysis is used to identify the features and semantic analysis is to determine what functional characteristics of the code associated with a feature, which may be aided by the use of a transaction library.

The method begins at step 110 wherein the feature extraction module 80 analyzing operational code to determine a plurality of identifiers used within the operational code, which will be described in greater detail with reference to FIG. 8. The operational code corresponds to a software program, a portion of software program, and/or a collection of software programs (e.g., a software system). A software program and/or a portion thereof may be years to decades old or it may be newly created. Further, a software program may include configuration files (which are used to set up these programs), system documentation (which describes the structure of the system), and user documentation (which explains how to use the system).

The method continues to step 112 wherein the feature extraction module groups like identifiers of the plurality of identifiers based a relational aspect of the identifiers to produce a plurality of identifier groups, which will be described in greater detail with references to one or more of FIGS. 9-12. The relational aspects include, but are not limited to, one or more of a spatial relationship (e.g., what is the proximity of like identifiers within the operational code, if in a cluster then more likely related than if distributed throughout the code); a temporal relationship (e.g., when where the like identifiers created, if created at approximately the same time the more likely related than if created at substantially different times); a word meaning relationship (e.g., words of the identifiers are similar and/or mean similar things); a conceptual relationship; a data relationship (e.g., identifiers are affiliated with the same or similar data); and programmer defined clustering.

For one or more identifier groups of the plurality of identifier groups, the method continues at step 114 where the feature extraction module determines one or more potential features of the one or more identifier groups, which will be described in greater detail with reference to one or more of FIGS. 13 and 14. A feature corresponds to an aspect of the operational code. For example, a feature corresponds to, but is not limited to, one or more of an architectural feature, an inputting of data feature, an outputting of data feature, an arithmetic feature, a conditional execution feature, a repetition feature, a function call feature, or a portion thereof.

For the current identified group, the method continues at step 116 where the feature extraction module tests the one or more potential features based on a corresponding feature test suite to produce feedback regarding meaningfulness of the one or more potential features. The feature test suite evolves in conjunction with the system 10 iteratively generating the new code 104. In general and based on the current level of development of the new code, the testing is determining whether the identified group corresponds to a likely feature, or features, of the operational code. The more likely the feature is a viable aspect of the operational code, the more meaningful it is.

As an example of testing, the system 10 identifies entry points of the operational code that corresponds to behaviors (e.g., one or more features, one or more groups of features, etc.) of the operational code. The system 10 extracts behavior flow for each entry point and removes unnecessary features. The system 10 translates the behavior flows into a test automation structure, which the system uses to generate stimuli to test decisions of the behavior flow. The iterative testing of developing application code (e.g., the new code) and the components thereof is described in co-pending patent application entitled System And Method For Implementing Application Code From Application Requirements, having a filing date of Jun. 22, 2105, and a Ser. No. 14/745,689.

For the current identified group, the method continues at step 118 where the feature extraction module determines whether the meaningfulness is above a threshold (e.g., it is at a desired level of likelihood that the grouping of identifiers corresponds to a viable feature of the operational code). When the meaningfulness is above the threshold, the method continues at step 120 where the feature extraction module adds the one or more potential features as one or more meaningful features to a feature set.

For the current identified group, when the meaningfulness is at or below the threshold, the method continues at step 122 where the feature extraction module determines whether options for adjusting parameters for the current identified group of identifiers has been exhausted (e.g., all options have been tested, a set number of options have been tested, etc.). If not, the method continues at step 124 where the feature extraction module adjusts the relational aspect and/or one or more testing parameters used to generate the corresponding feature test suite. The method then repeats at step 116. If the options have been exhausted, the method continues at step 126 where the feature extraction module determines that the current grouping identifiers does not correspond to a meaningful feature.

When the processing of the current identified group is completed (e.g., step 120 or step 126 has been performed), the method continues at step 128 where the extraction module determines whether to restart. The restarting may be restarting the analyzing of the operational code to identify identifiers or restarting the grouping of like identifiers. The feature extraction module may restart for a variety of reasons. For example, the system 10 sends the feature extraction module a command to restart the analyzing or to restart the grouping. As another example, the feature extraction module determines that it has not generated enough meaningful features from the operational code. Depending on how few meaningful features it has identified, the feature extraction module determines whether to restart by reanalyzing the code or to restart by regrouping. As yet another example, the feature extraction module determines that it is generating too many meaningful features from the operational code. As a further example, the feature extraction module determines that some identified meaningful features are not meaningful together (e.g., while the features seemed to be part of a common portion of the operational code (e.g., subroutine) it turns out that they are not part of a common portion). If the feature extraction module determines to restart, the method repeats at step 110 and/or 112.

If the feature extraction module determines not to restart, the method continues at step 130 where the feature extraction module determines whether the code has been exhausted (e.g., all of the code has been analyzed or a desired portion of the code has been analyzed). If yes, the feature extraction module outputs the feature set (i.e., the features 92) at step 134. If not, the method continues at step 132 where the feature extraction module repeats the method at step 114 for the next group of identifiers.

Figure 8:
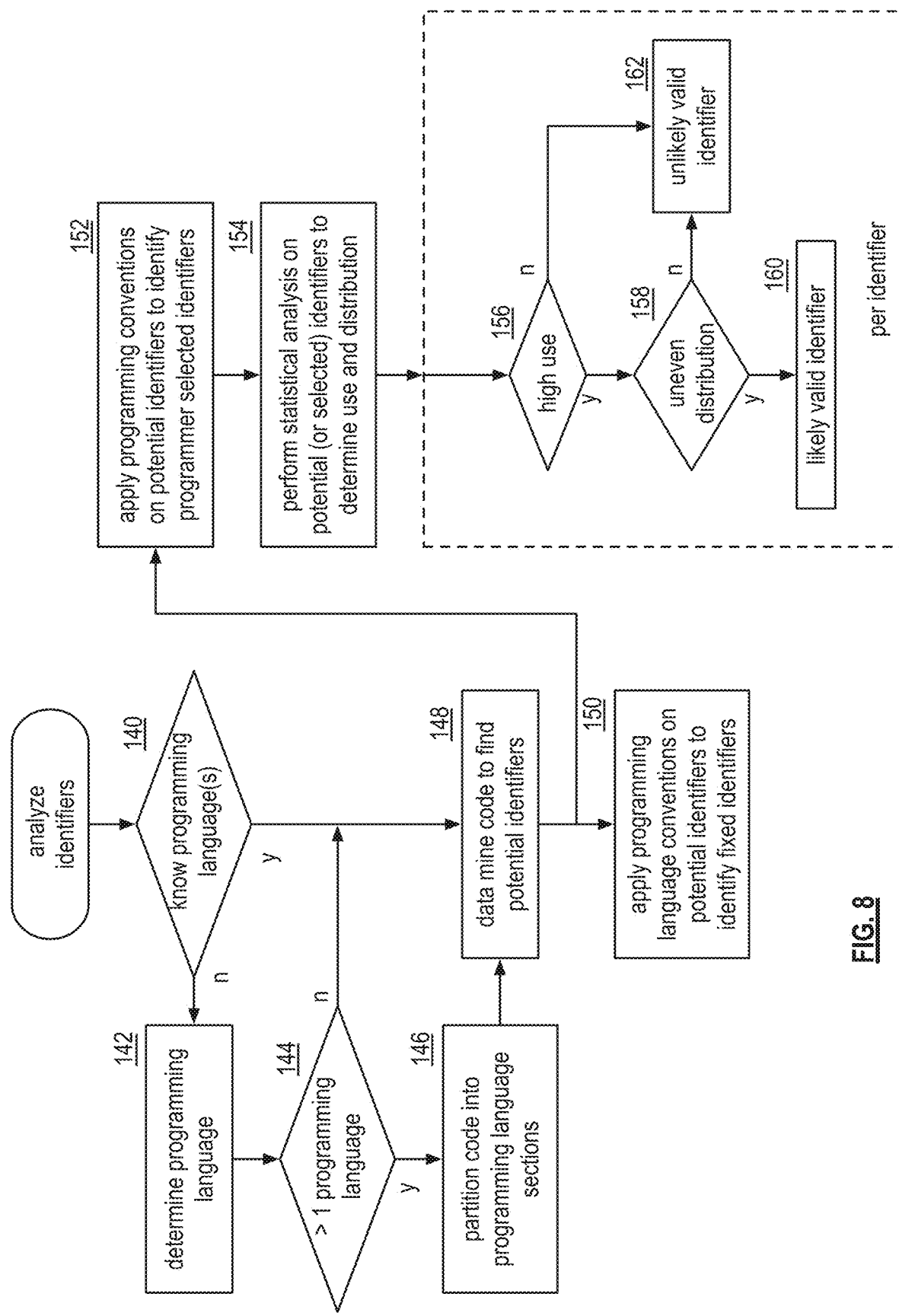
FIG. 8 is a logic diagram of a further embodiment of a method executed by a feature extraction module of a legacy software processing system in accordance with the present invention.

FIG. 8 is a logic diagram of a further embodiment of a method executed by a feature extraction module of a legacy software processing system to analyze code to identify identifiers. The method of analyzing may begin at step 140 or at step 148. For discussion purposes, the method begins at step 140 where the feature extraction module determines whether the programming language(s) of the operational code 15 is known. In general, most programming languages include syntax and semantics. Syntax corresponds to a set of rules that defines combinations of symbols to establish the form of the programming language. Semantics corresponds to the meaning of the valid combination of symbols (e.g., if-else statements use "if" and "else" as delineators of true and false outcomes of an if-else statement).

While there our thousands of programming languages, almost, if not all, of them have basic instructions sets for inputting data; outputting data, performing arithmetic functions, controlling execution of the program; conditional operations, and for indicating repetition of a portion of the program. In additional, many programmers adhere to a form of software quality requirements regarding reliability (e.g., how often it produces correction results); robustness (e.g., how it anticipates problems due to errors (not bugs)); usability (e.g., its ergonomics); portability (e.g., the range of computer hardware and operating system platforms on which the source code can be compiled); maintainability (e.g., the ease with which a program can be modified); and efficiency/performance (e.g., the amount of system resources a program consumes). These various factors of programming languages and software quality requirements aid in the determination of identifiers.

If the programming language is not known, the method continues at step 142 where the feature extraction module determines the programming language. For example, the feature extraction module invokes execution of one or more programming specific compilers and/or programming language specific interpreters on at least a portion of the operational code. The compiler and/or interpreter producing viable results is indicative of the programming language for the corresponding portion of the operational code. Alternatively and/or in addition, parsers may be used to identify the programming language(s) of the operational code.

The method continues at step 144 where the feature extraction module determines whether the operational code includes more than one programming language. If yes, the method continues at step 146 where the feature extraction module partitions, or divides, the operational code into a plurality of code sections based on the different programming languages.

Once the operational code has been divided into a plurality of sections, or it is written using a single programming language, the method continues at steps 148-160, which may be performed sequentially, in concurrency, or in any order. Via steps 148-160, the feature extraction module data mines the operational code to find identifiers. If the operational code includes the plurality of sections of different programming language, then the data mining is done on a section-by-section basis.

At step 148, the feature extraction module utilizes one or more text recognition tools to data mine the operational code to find potential identifiers. For example, the feature extraction module utilizes a word processing algorithm to identify words, phrases, etc. of the operational code. The words, phrases, etc. are then processed by the text recognition tool(s) to determine the potential identifiers. For example, one text recognition tool will analyze the words, phrases, etc. based on concepts (e.g., tax calculation, fraud detect, etc.) to identify potential identifiers. As another example, another text recognition tool will analyze the words, phrases, etc. based on related words (e.g., customer name, customer address, customer age, etc.) to identify potential identifiers. As yet another example, another text recognition tool will analyze the words, phrases, etc. based on use of camel case (e.g., Customer_First_Name, etc.) to identify potential identifiers.

At step 150, the feature extraction module applies one or more programming language conventions on the possible identifiers to determine fixed identifiers of the one or more programming language conventions. As is known, most programming languages define specific words and/or phrases to have specific meanings (e.g., "if", "then", "else", "count", etc.). The specific words and/or phrases may correspond to key words, operators, language specific identifiers, etc. As such, if one of the possible identifiers corresponds to a specific word and/or phrase of the programming language, the possible identifier is determined to be a fixed identifier.

At step 152, the feature extraction module applies one or more programming conventions on the possible identifiers to determine whether the possible identifiers correspond to programmer selected identifiers. The programming convention, or programming style, is a set of guidelines as to how a programming should program operational code for one or more programming languages. For example, a programming convention establishes guidelines for the use of indentation styles, comments, decomposition (breakdown of complex problems into smaller, easier to understand parts), naming convention, declarations, statements, programming practices, programming principles, architectural best practices, etc. Utilizing the programming conventions aid in the determining of valid identifiers.

In particular, the use of naming conventions aid in the determination of valid identifiers. A naming convention is a set of rules for choosing the character sequence to establish identifiers of variables, types, functions, and other entities of the source code and its supporting documentation. As an example, a naming convention includes one or more of descriptions for the use of word groupings, camel case, Hungarian notation, use of underscoring and hyphens, positional notation, language specific conventions, two nouns, not starting an identifier with a number, non-use of white spaces in an identifier, non-use of language operators in an identifier, noun and a verb, and use of underscoring or hyphen.

At step 154, the feature extraction module perform statistical analysis on the programmer selected identifiers to determine which of the programmer selected identifiers are identifiers of the plurality of identifiers. For example, a statistical analysis is described with reference to steps 156-160. At step 156, the feature extraction module determines the use of a particular identifier. If the use is high (e.g., above a predetermined number based on the complexity of the operational code, which is at least five), the method continues at step 158, where the feature extraction module determines whether the distribution of the use of the identifier throughout the operational code is substantially evenly distributed or is primarily contained within a limited section of the code. If the distribution is primarily within the limited section, the method continues at step 160 where the feature extraction module indicates that the identifier is a likely valid identifier. If the distribution is substantially even or the use is low, then the method continues at step 162 where the feature extraction module indicates that the identifier is unlikely a valid identifier.

Figure 9:
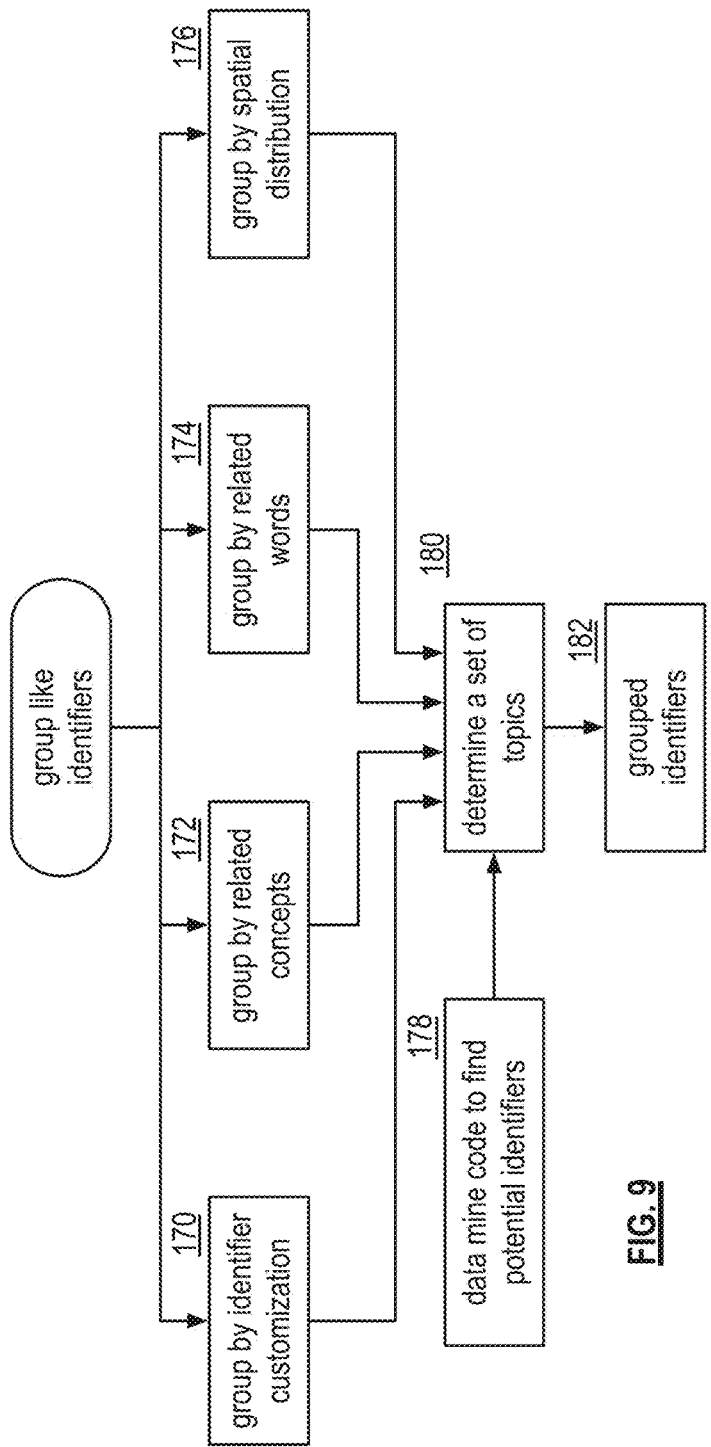
FIG. 9 is a logic diagram of a further embodiment of a method executed by a feature extraction module of a legacy software processing system in accordance with the present invention.

FIG. 9 is a logic diagram of a further embodiment of a method executed by a feature extraction module of a legacy software processing system to group identifiers. The method includes steps 170-182, which may be executed sequentially, in concurrence, or in any order. The feature extraction module determines a set of topics at step 180 based on the data mining of step 178 (which is similar to step 148 of FIG. 8) and the grouping parameters of steps 170-176. The set of topics may be list or tabular form, which sorts the grouping of identifiers based on the parameters of steps 170-176.

Figure 10:
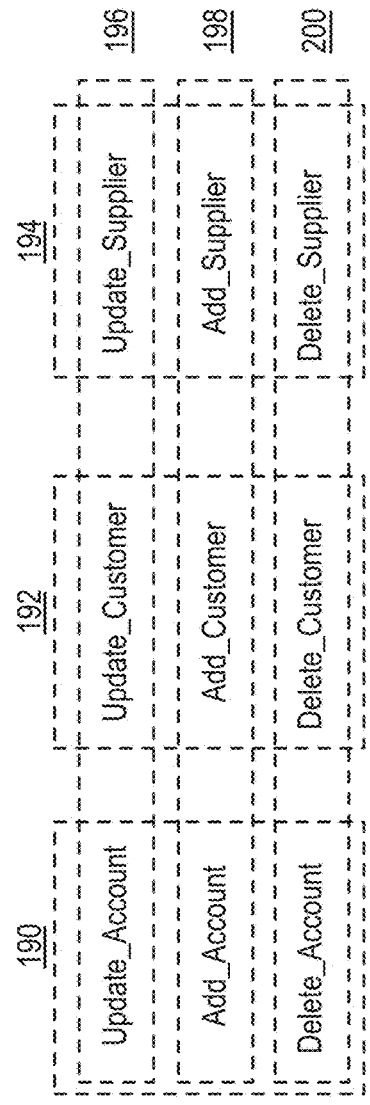
FIG. 10 is a diagram of an example of grouping identifiers in accordance with the present invention.

At step 170, the feature extraction module groups the identifiers based on customization (e.g., programmer created identifiers). For example, identifiers are grouped based on camel case, use of underscoring, use of hyphens, and/or other naming conventions. At step 172, the feature extraction module groups the identifiers based on concepts (e.g., tax calculation, fraud detect, etc.). At step 174, the feature extraction module groups the identifiers based on related words. FIG. 10 provides an example of grouping based on related words. At step 176, the feature extraction module groups the identifiers based on their spatial distribution (e.g., are in same section of the code).

At step 182, the feature extraction module groups the identifiers based on the set of topics. This may create layers of grouping depending on which parameters are given priority. FIG. 10 provides an example of different layers of grouping based on different priorities.

FIG. 10 is a diagram of an example of grouping nine identifiers: Update_Account; Update_Customer; Update_Supplier; Add_Account; Add_Customer; Add_Supplier; Delete_Account; Delete_Customer; and Delete_Supplier. The nine identifiers may be grouped in six different ways. In a first grouping 190, priority is given to the word "Account". In a second grouping 192, priority is given to the word "Customer". In a third grouping 194, priority is given to the word "Supplier". In a fourth grouping 196, priority is given to the concept of "Updating". In a fifth grouping 198, priority is given to the concept of "Adding". In a sixth grouping 200, priority is given to the concept of "Deleting".

Figure 11:
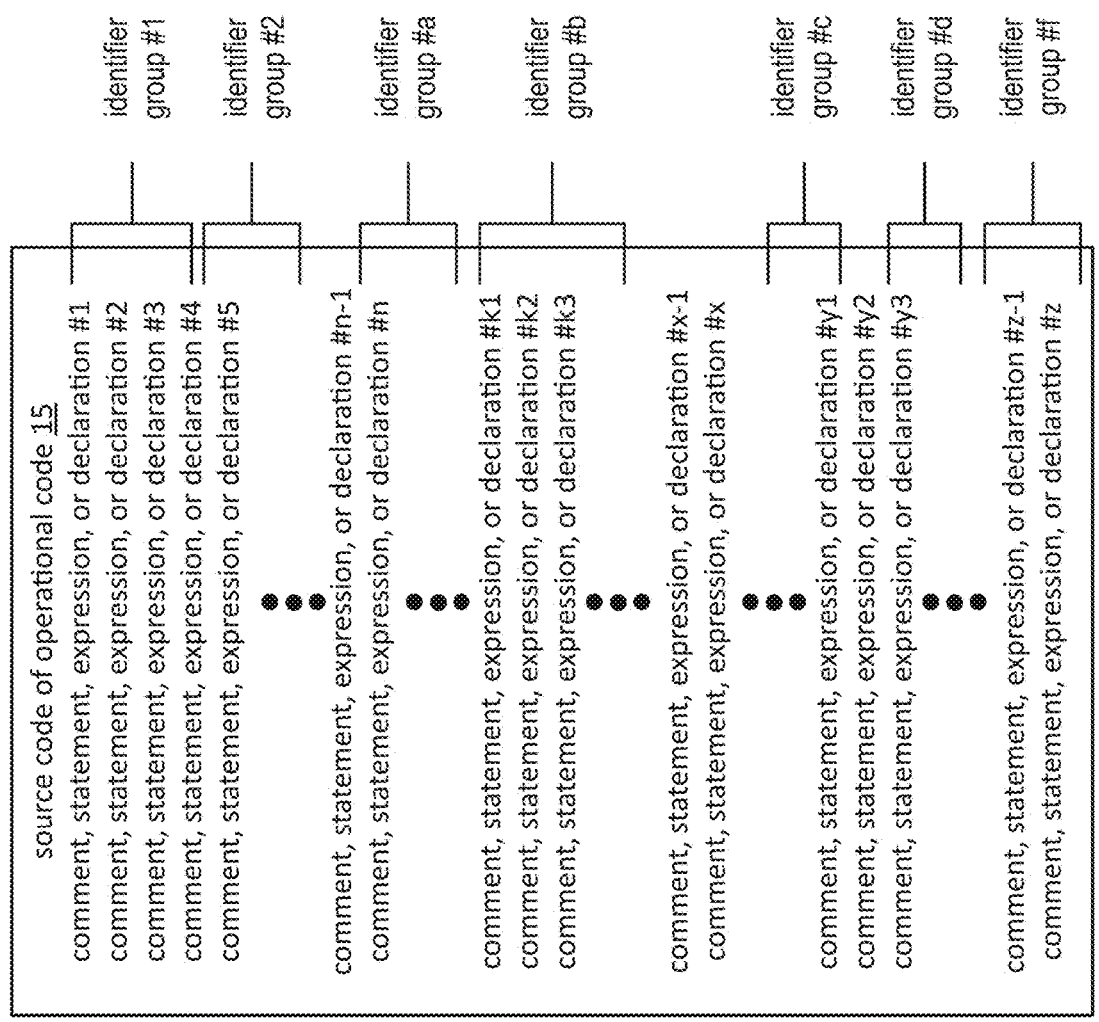
FIG. 11 is a diagram of another example of grouping identifiers in accordance with the present invention.

FIG. 11 is a diagram of another example of grouping identifiers of the operational code 15. In this example, various lines of code correspond to grouping of identifiers. For example, identifier group #1 includes lines of code 1-4.

Figure 12:
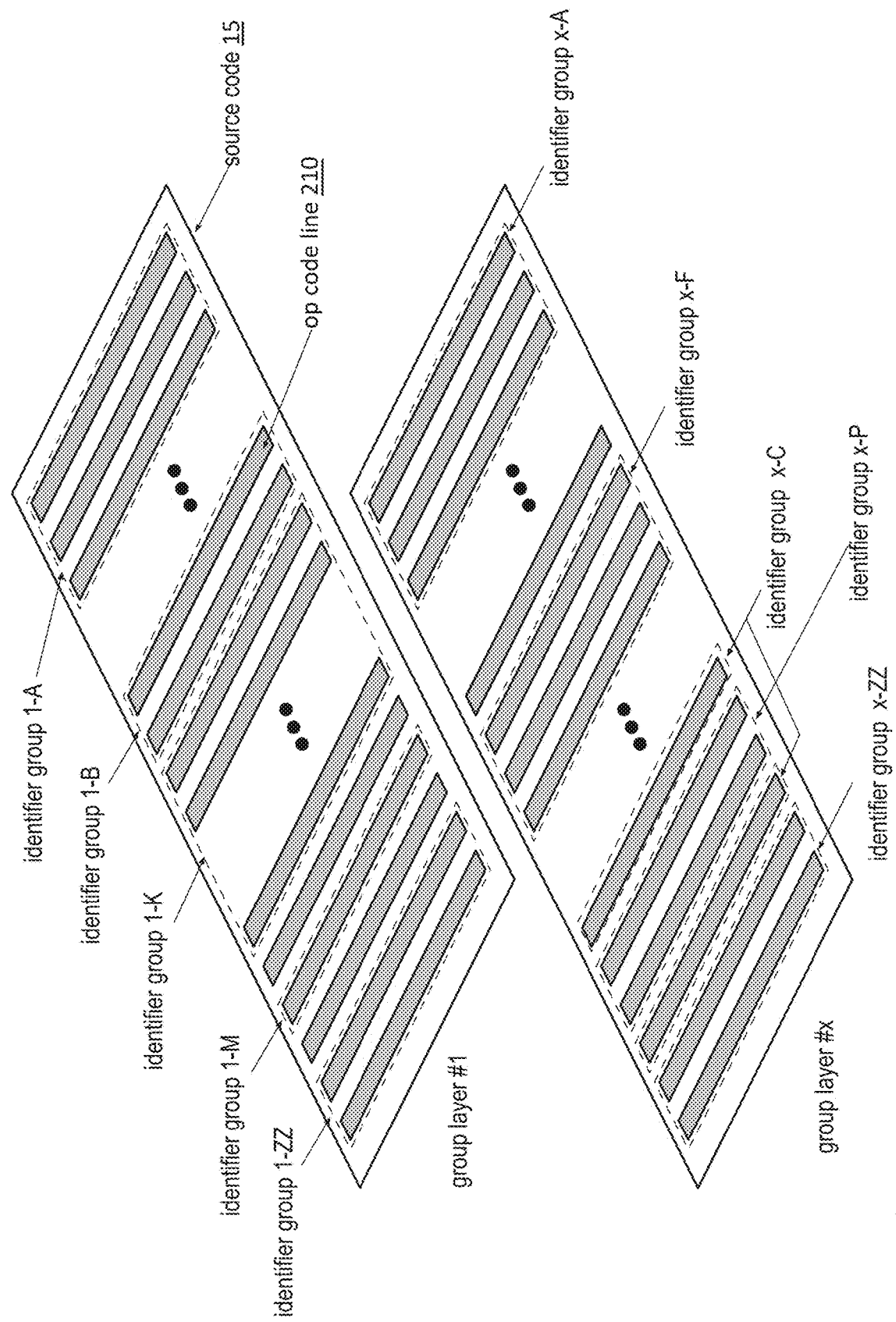
FIG. 12 is a diagram of yet another example of grouping identifiers in accordance with the present invention.

FIG. 12 is a diagram of yet another example of grouping identifiers of the source code of operational code 15. This example includes a plurality of grouping layers (e.g., #1 through #x). Each layer has a different prioritization of the grouping (e.g., word meaning, concept, spatial positioning, etc.). As such, from layer to layer, a group may include different lines of code 210. Further, a grouping on one layer is somehow related to a grouping on another layer (e.g., grouping 1-A is somehow related to grouping x-A). For example, the different groupings of the identifiers of FIG. 10 would be on separate layers, but related due to their wording meanings and concepts.

Figure 13:
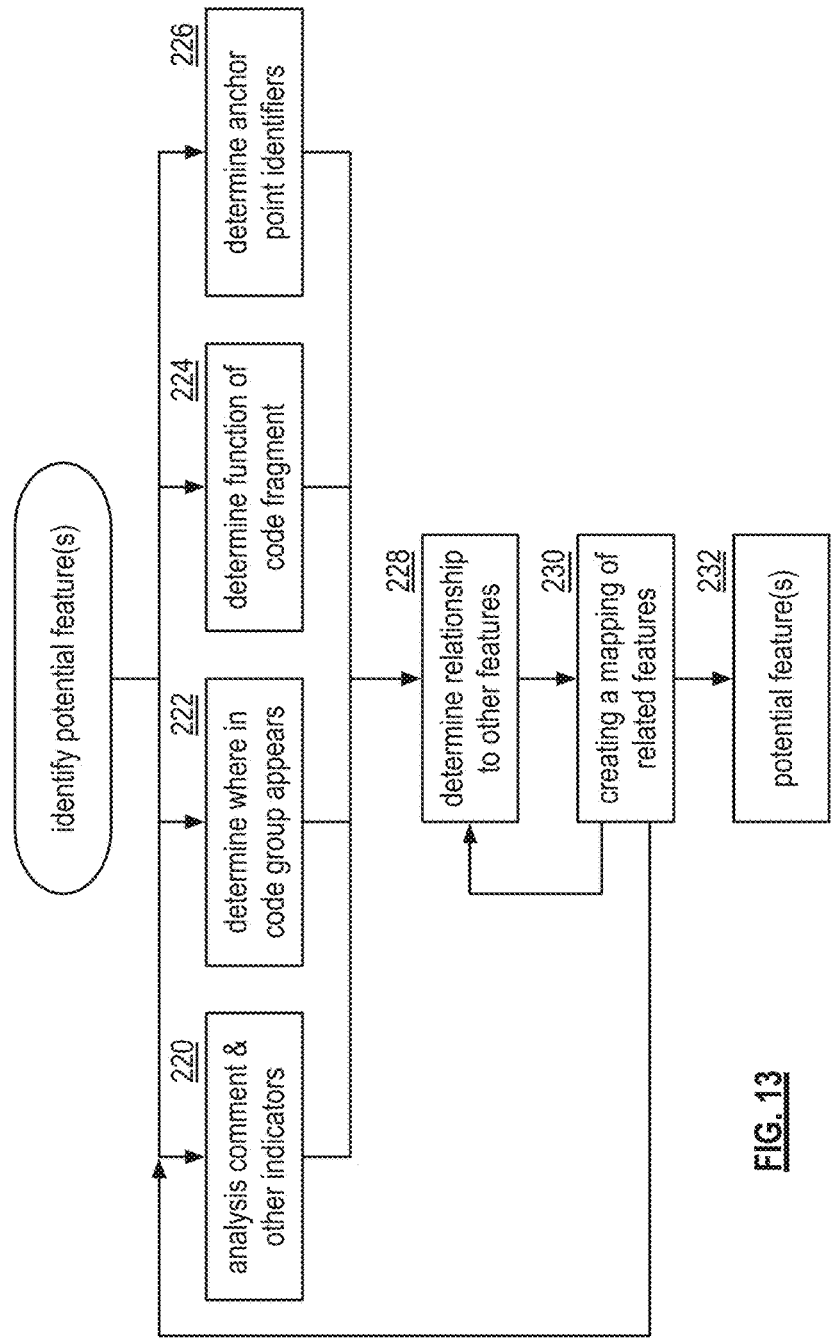
FIG. 13 is a logic diagram of a further embodiment of a method executed by a feature extraction module of a legacy software processing system in accordance with the present invention.

FIG. 13 is a logic diagram of a further embodiment of a method executed by a feature extraction module of a legacy software processing system to generate the features 92. The method includes steps 220 through 232, which may be executed sequentially, in concurrence, and/or in any order. As previously stated, a feature 92 is, from a programmer's perspective, a relevant piece of the source code. As such, a feature may be a single line of code (e.g., a comment, a statement, an expression, or a declaration) or a plurality of lines of code (e.g., a collection of comments, statements, expressions, and/or declarations). As a few examples of an almost endless possibility of examples, one feature is code regarding updating a user's account; another feature is a code regarding creating a user account; yet another feature is code regarding billing the user; a further feature is an idiom, and yet a further feature is a business rule.

In general, to identify features of the operational code, the feature extraction module is looking for patterns in the code that corresponds to a relevant piece of the code. To find the patterns, the feature extraction module executes one or more of steps 220-226. At step 220, the feature execution module analyzes the comments and other programmer dependent indicators of the operational code. The comments may indicate the programmer's intended operation of a particular section of the code. Since most programming languages and corresponding programming conventions do not dictate specific formatting and vernacular for comments, comment analysis alone may be insufficient to adequately identifier the features 92.

At step 222, the feature extraction module determines wherein the operational code the potential feature resides. Based on the location within the code, the feature extraction module determines whether the functionality of the feature(s) is typically included in such a location of the operational code. If yes, it is likely a valid feature(s). If not, then it is likely not a valid feature(s).

At step 224, the feature extraction module determines functionality of the code fragment (e.g., the one or more lines of code) affiliated with the feature(s). For example, the feature extraction module determines whether the functionality of the feature(s) correspond to expected functionality. If yes, it is likely a valid feature(s). If not, then it is likely not a valid feature(s). As another example, the feature extraction module determines whether the functionality of the feature(s) is compatible with the functionality of features to which it is tied. If yes, it is likely a valid feature(s). If not, then it is likely not a valid feature(s). As yet another example, the feature extraction module determines whether the functionality of the feature is different in different parts of the operational code in which of the feature appears. If yes, it is likely not a valid feature(s). If not, then it is likely a valid feature(s).

At step 226, the feature extraction module utilizes anchor points to identify a feature(s). As discussed above, an anchor point is a tag that specifies a subroutine, a library entry, a specific feature, and/or a specific set of features. As such, features that are affiliated with an anchor point have a relationship based on the anchor point and are likely valid features.

The method continues at steps 228-232, where the feature extraction module establishes likely valid features. For example, the feature extraction module determines a feature parameter set based on the relational aspect of the identifiers for the one or more identifier groups (e.g., comments, location in the code, function, anchor point). The feature extraction module analyzes comments, statements, expressions, or declarations of the operational code that contain identifiers of the one or more identifier groups based on the feature parameter set. The feature extraction module establishes the feature(s) when the analysis of the comments, the statements, the expressions, or the declarations of the operational code that contain the identifiers of the one or more identifier groups yields a favorable result (e.g., is likely to be a valid feature(s)).

As another example, the feature extraction module determines a plurality of feature parameter sets, wherein a feature parameter set of the plurality of feature parameter sets is based on a corresponding relational aspect of a plurality of relational aspects of the identifiers for the one or more identifier groups. For each feature parameter set of the plurality of feature parameter sets, the feature extraction module analyzes comments, statements, expressions, or declarations of the operational code that contain identifiers of the one or more identifier groups based on the feature parameter set. When the analysis of the comments, the statements, the expressions, or the declarations of the operational code that contain the identifiers of the one or more identifier groups yields a favorable result, the feature extraction module establishes a possible feature, wherein, when the plurality of feature parameter sets have been used to analyze the operational code, a plurality of possible features is created. The feature extraction module then selects one or more of possible features as the one or more potential features, where the selection is based on testing, a priority scheme, other information regarding the code, etc.

As a further example, the feature extraction module determines, for a code section, that the potential feature(s) corresponds to an emulator or a programming language converter. The feature extraction module tests the potential feature(s) based on a corresponding feature test suite. When the testing verifies that the potential feature(s) corresponds to an emulator or the programming language converter, the feature extraction module flags the code section as including the emulator or the programming language converter. As such, when the operational code is reprogrammed into a desired programming language, the emulator or the programming language converter is not reprogrammed.

Figure 14:
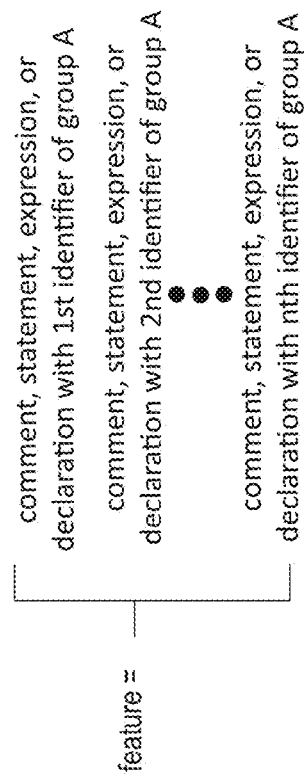
FIG. 14 is a diagram of an example of a feature in accordance with the present invention.

FIG. 14 is a diagram of an example of a feature that includes one or more lines of code of the operational code. In this example, the feature corresponds to a plurality of lines of code, which correlates to an important aspect of the operational code.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc., any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device, the method comprises:
    analyzing, by the computing device, operational code to determine a plurality of identifiers used within the operational code and identify different programming languages within the operational code, wherein the analyzing further includes:
        dividing the operational code into a plurality of code sections based on the different programming languages;
        for each code section of the plurality of code sections, ascertaining identifiers of the plurality of identifiers based on the corresponding programming language of the different programming languages;
        determining, for a code section of the plurality of code sections, that the one or more potential features corresponds to an emulator or a programming language converter;
        testing the one or more potential features based on a corresponding feature test suite; and
        when the testing verifies that the one or more potential features corresponds to an emulator or the programming language converter, flagging a corresponding portion of the code section as including the emulator or the programming language converter such that, when the operational code is reprogrammed into a desired programming language, the emulator or the programming language converter is not reprogrammed; and
    grouping, by the computing device, like identifiers based on a relational aspect of the identifiers to produce a plurality of identifier groups;
    for one or more identifier groups of the plurality of identifier groups:
        determining, by the computing device, one or more potential features of the one or more identifier groups, wherein a feature corresponds to an aspect of the operational code;
        testing, by the computing device, the one or more potential features based on a corresponding feature test suite to produce feedback regarding meaningfulness of the one or more potential features, wherein the meaningfulness of a feature indicates the degree to which it is likely the feature is a viable aspect of the operational code;
        when the meaningfulness is above a threshold, adding, by the computing device, the one or more potential features as one or more meaningful features to a feature set; and
        when the meaningfulness is at or below the threshold, adjusting, by the computing device, one or more of:
            the relational aspect; and
            one or more testing parameters used to generate the corresponding feature test suite; and
    reprogramming the operational code into the desired programming language.

2. The method of claim 1, wherein the analyzing the operational code comprises:
    data mining the operational code to identify possible identifiers;
    applying one or more programming conventions on the possible identifiers to determine whether the possible identifiers correspond to programmer selected identifiers; and
    performing statistical analysis on the programmer selected identifiers to determine which of the programmer selected identifiers are identifiers of the plurality of identifiers.

3. The method of claim 2, wherein a naming convention of the one or more programming conventions comprises one or more of:
    word groupings;
    camel case;
    Hungarian notation;
    positional notation;
    language specific conventions;
    two nouns;
    not starting an identifier with a number;
    non-use of white spaces in an identifier;
    non-use of language operators in an identifier;
    noun and a verb; and
    use of underscoring or hyphen.

4. The method of claim 2, wherein performing the statistical analysis comprises:
    determining a level of use of a possible identifier;
    when the level of use is above a use threshold, determining distribution of the possible identifier within the operational code; and when the distribution is above an unevenness threshold, identifying the possible identifiers as identifiers of the plurality of identifiers.

5. The method of claim 1, wherein the analyzing the operational code comprises:
data mining the operational code to identify possible identifiers;
applying one or more programming language conventions on the possible identifiers to determine fixed identifiers of the one or more programming language conventions; and
indicating that the fixed identifiers are identifiers of the plurality of identifiers.

6. The method of claim 1, wherein the relational aspect of the identifiers comprises one or more of:
a spatial relationship;
a temporal relationship;
a word meaning relationship;
a conceptual relationship;
a data relationship; and
programmer defined clustering.

7. The method of claim 1, wherein the determining the one or more potential features comprises:
determining a feature parameter set based on the relational aspect of the identifiers for the one or more identifier groups;
analyzing comments, statements, expressions, or declarations of the operational code that contain identifiers of the one or more identifier groups based on the feature parameter set; and
when the analysis of the comments, the statements, the expressions, or the declarations of the operational code that contain the identifiers of the one or more identifier groups yields a favorable result, establishing the one or more potential features.

8. The method of claim 1, wherein the determining the one or more potential features comprises:
determining a plurality of feature parameter sets, wherein a feature parameter set of the plurality of feature parameter sets is based on a corresponding relational aspect of a plurality of relational aspects of the identifiers for the one or more identifier groups;
for each feature parameter set of the plurality of feature parameter sets:
analyzing comments, statements, expressions, or declarations of the operational code that contain identifiers of the one or more identifier groups based on the feature parameter set; when the analysis of the comments, the statements, the expressions, or the declarations of the operational code that contain the identifiers of the one or more identifier groups yields a favorable result, establishing a possible feature, wherein, when the plurality of feature parameter sets have been used to analyze the operational code, a plurality of possible features is created; and
selecting one or more of the plurality of possible features as the one or more potential features.

9. A computing device comprises:
one or more interfaces;
one or more memories; and
one or more processing circuits that are operably coupled to the one or more interfaces and to the one or more memories, wherein the one or more processing circuits are operable to:
analyze operational code to determine a plurality of identifiers used within the operational code and identify different programming languages within the operational code, wherein the analyzing further includes:
dividing the operational code into a plurality of code sections based on the different programming languages;
for each code section of the plurality of code sections, ascertaining identifiers of the plurality of identifiers based on the corresponding programming language of the different programming languages;
determining, for a code section of the plurality of code sections, that the one or more potential features corresponds to an emulator or a programming language converter;
testing the one or more potential features based on a corresponding feature test suite; and
when the testing verifies that the one or more potential features corresponds to an emulator or the programming language converter, flagging a corresponding portion of the code section as including the emulator or the programming language converter such that, when the operational code is reprogrammed into a desired programming language, the emulator or the programming language converter is not reprogrammed; and
group like identifiers of the plurality of identifiers based on a relational aspect of the identifiers to produce a plurality of identifier groups;
for one or more identifier groups of the plurality of identifier groups:
determine one or more potential features of the one or more identifier groups, wherein a feature corresponds to an aspect of the operational code;
test the one or more potential features based on a corresponding feature test suite to produce feedback regarding meaningfulness of the one or more potential features, wherein the meaningfulness of a feature indicates the degree to which it is likely the feature is a viable aspect of the operational code;
when the meaningfulness is above a threshold, add the one or more potential features as one or more meaningful features to a feature set; and
when the meaningfulness is at or below the threshold, adjust one or more of:
the relational aspect; and
one or more testing parameters used to generate the corresponding feature test suite; and
reprogramming the operational code into the desired programming language.

10. The computing device of claim 9, wherein the one or more processing circuits is further operable to analyze the operational code by:
data mining the operational code to identify possible identifiers;
applying one or more programming conventions on the possible identifiers to determine whether the possible identifiers correspond to programmer selected identifiers; and
performing statistical analysis on the programmer selected identifiers to determine which of the programmer selected identifiers are identifiers of the plurality of identifiers.

11. The computing device of claim 10, wherein a naming convention of the one or more programming conventions comprises one or more of:

word groupings;
camel case;
Hungarian notation;
positional notation;
language specific conventions;
two nouns;
not starting an identifier with a number;
non-use of white spaces in an identifier;
non-use of language operators in an identifier;
noun and a verb; and
use of underscoring or hyphen.

12. The computing device of claim 10, wherein the one or more processing circuits is further operable to perform the statistical analysis by:
determining a level of use of an identifier;
when the level of use is above a use threshold, determining distribution of the possible identifier within the operational code; and
when the distribution is above an unevenness threshold, identifying the possible identifiers as one of the identifiers of the plurality of identifiers.

13. The computing device of claim 9, wherein the one or more processing circuits is further operable to analyze the operational code by:
data mining the operational code to identify possible identifiers;
applying one or more programming language conventions on the possible identifiers to determine fixed identifiers of the one or more programming language conventions; and
indicating that the fixed identifiers are identifiers of the plurality of identifiers.

14. The computing device of claim 9, wherein the relational aspect of the identifiers comprises one or more of:
a spatial relationship;
a temporal relationship;
a word meaning relationship;
a conceptual relationship;
a data relationship; and
programmer defined clustering.

15. The computing device of claim 9, wherein the one or more processing circuits is further operable to determine the one or more potential features by:
determining a feature parameter set based on the relational aspect of the identifiers for the one or more identifier groups;
analyzing comments, statements, expressions, or declarations of the operational code that contain identifiers of the one or more identifier groups based on the feature parameter set; and
when the analysis of the comments, the statements, the expressions, or the declarations of the operational code that contain the identifiers of the one or more identifier groups yields a favorable result, establishing the one or more potential features.

16. The computing device of claim 9, wherein the one or more processing circuits is further operable to determine the one or more potential features by:
determining a plurality of feature parameter sets, wherein a feature parameter set of the plurality of feature parameter sets is based on a corresponding relational aspect of a plurality of relational aspects of the identifiers for the one or more identifier groups;
for each feature parameter set of the plurality of feature parameter sets:
analyzing comments, statements, expressions, or declarations of the operational code that contain identifiers of the one or more identifier groups based on the feature parameter set; when the analysis of the comments, the statements, the expressions, or the declarations of the operational code that contain the identifiers of the one or more identifier groups yields a favorable result, establishing a possible feature, wherein, when the plurality of feature parameter sets have been used to analyze the operational code, a plurality of possible features is created; and
selecting one or more of the possible features as the one or more potential features.

* * * * *